(12) United States Patent
Kiesbauer et al.

(10) Patent No.: US 8,869,675 B2
(45) Date of Patent: Oct. 28, 2014

(54) ACTUATING DRIVE FOR POSITIONING A FINAL CONTROL ELEMENT AND METHOD FOR CAPTURING A POSITION OF THE FINAL CONTROL ELEMENT

(75) Inventors: Joerg Kiesbauer, Eppertshausen (DE); Stefan Kolbenschlag, Darmstadt (DE); Karl-Bernd Schaertner, Nidderau (DE); Frank Valentin-Rumpel, Gross-Umstadt (DE)

(73) Assignee: Samson Aktiengesellschaft, Frankfurt (DE)

( * ) Notice: Subject to any disclaimer, the term of this patent is extended or adjusted under 35 U.S.C. 154(b) by 823 days.

(21) Appl. No.: 13/085,092

(22) Filed: Apr. 12, 2011

(65) Prior Publication Data

US 2011/0247484 A1   Oct. 13, 2011

(30) Foreign Application Priority Data

Apr. 12, 2010 (DE) .................... 10 2010 014 668

(51) Int. Cl.
| | | |
|---|---|---|
| *F16K 37/00* | (2006.01) | |
| *F15B 15/14* | (2006.01) | |
| *F15B 15/28* | (2006.01) | |
| *G01B 7/14* | (2006.01) | |
| *G01B 7/02* | (2006.01) | |
| *G01B 7/00* | (2006.01) | |
| *F15B 15/10* | (2006.01) | |

(52) U.S. Cl.
CPC ............ *G01B 7/023* (2013.01); *F16K 37/0033* (2013.01); *F15B 15/1476* (2013.01); *F15B 15/2861* (2013.01); *F15B 15/10* (2013.01); *G01B 7/14* (2013.01); *F16K 37/0041* (2013.01); *G01B 7/003* (2013.01)
USPC ............................................. 91/1

(58) Field of Classification Search
CPC .. F15B 15/28; F15B 15/2815; F15B 15/2869; F15B 15/2892; F16K 31/1262; F16K 37/0025; F16K 37/0033
USPC ........................................... 91/1, 361; 92/5 R
See application file for complete search history.

(56) References Cited

U.S. PATENT DOCUMENTS

| | | | |
|---|---|---|---|
| 3,859,619 | A | 1/1975 | Ishihara et al. |
| 4,566,196 | A | 1/1986 | Brausfeld et al. |
| 4,794,841 | A * | 1/1989 | Kemmler et al. .................. 91/1 |
| 6,752,171 | B1 * | 6/2004 | Kemmler et al. ............ 137/552 |
| 7,451,684 | B2 | 11/2008 | Muller et al. |

(Continued)

FOREIGN PATENT DOCUMENTS

| | | |
|---|---|---|
| DE | 2335052 | 2/1974 |
| DE | 3331720 A1 | 3/1985 |
| DE | 10223870 A1 | 12/2003 |
| DE | 102008011701 A1 | 9/2009 |
| EP | 0917675 B1 | 9/2000 |
| EP | 1593893 B1 | 10/2007 |
| EP | 1846681 B1 | 8/2008 |
| EP | 1752665 B1 | 5/2009 |

*Primary Examiner* — Thomas E Lazo
(74) *Attorney, Agent, or Firm* — Schiff Hardin LLP

(57) ABSTRACT

In an actuating drive or method for capturing a position of a final control element to be positioned by a drive member of the actuating drive, the final control element is pushed from an initial position to a target position by a spring body acting on the drive member. A first reference position is spatially configured in a vicinity of or at the spring body. A second reference position moving relative to the first reference position during positioning movement of the drive member is spatially configured adjacent a first outer surface of the spring body. A distance between the first reference position and the second reference position is captured.

24 Claims, 2 Drawing Sheets

(56) References Cited

U.S. PATENT DOCUMENTS

| | | | |
|---|---|---|---|
| 2004/0031911 A1* | 2/2004 | Hoffmann et al. | ....... 250/227.19 |
| 2004/0154466 A1 | 8/2004 | Gethmann et al. | |
| 2005/0247351 A1 | 11/2005 | Kubota et al. | |
| 2008/0204175 A1 | 8/2008 | Barabas-Lammert | |
| 2009/0121169 A1 | 5/2009 | Porath | |

* cited by examiner

ACTUATING DRIVE FOR POSITIONING A FINAL CONTROL ELEMENT AND METHOD FOR CAPTURING A POSITION OF THE FINAL CONTROL ELEMENT

BACKGROUND

The disclosure relates to an actuating drive for positioning a final control element, in particular a valve member for a technical processing plant, as well as a method for capturing the position or the regulating distance of the final control element. Known actuating drives often feature a safety function by means of which the final control element can be moved to a safety position such as a completely open or completely closed position of a valve member. In order to realize a safety function, the known actuating drive has at least one return spring.

In many areas of application, the actuating drives are driven by a working fluid, for example hydraulically or pneumatically. These so-called fluid drives are employed in plant automation and process engineering. The fluid drives have a piston or a membrane as a pressure bearing surface. Depending on the mechanical coupling of the piston or the membrane to motion transmitting drives, a linear or pivoting movement can be produced. In the case of failure of the fluidic drive energy, the defined safety position is to be adopted, which is realized by the mechanical return spring.

In many applications, these kinds of actuating drives are part of a control circuit, wherein a position measuring unit detects the position of the final control element. Preferably a fluid is used for powering the drive, but electrical actuating drives realizing a safety position by means of a spring are also known.

A magnetic actuating drive with a spring for the safety position is described by US 20080204175 A1. This application discloses a plunger coil as an electro-magnetic drive which is part of a control circuit, wherein the position of the drive is detected at the driving rod by means of a lever.

EP 917675 B1 describes a positioner for a pneumatic drive with three springs, a position controller and a position reporter coupled to a pushing rod similar to the actuating drive of US 20080204175. A minimum positioning step width is determined and further positioning steps are determined.

Another kind of position detection at a piston drive is described by EP 1752665 B1. Here a pneumatic drive with a microwave position measurement is provided. In this case, there are no springs for the safety position.

EP 1846681 B1 describes an apparatus for controlling a switching movement of a valve. A valve drive in the form of a linear piston with a spring is coupled to a valve member, and the valve movement is measured at the side facing away from the valve by means of position indicators.

Another type of actuating drive is presented in EP 1 593 893 A1 for a safety valve. A piston performs a linear movement that, however, is transformed into a pivoting movement of the shaft. A spring is disposed not directly at the piston but at the opposite side of a driving rod.

A disadvantage of the actuating drives with a safety position available to date is the lack of protection against injury and the mechanical vulnerability against damage when for example a lever or gear mechanism is connected to a drive rod. Besides, the known systems suffer from a lack of flexibility in combining different regulating distances for an actuating drive, in particular if a position measurement is to be provided near the actuating drive.

SUMMARY

It is an object to overcome at least some of the disadvantages of the prior art, in particular to propose an actuating drive with a position measurement, wherein the structure of the position measurement is protected against influences from the outside, without increasing the structural complexity. In particular, openly exposed levers may be avoided. Finally, the position measurement may be applicable for different regulating distances at an actuating drive.

In an actuating drive or method for capturing a position of a final control element to be positioned by a drive member of the actuating drive, the final control element is pushed from an initial position to a target position by a spring body acting on the drive member. A first reference position is spatially configured in a vicinity of or at the spring body. A second reference position moving relative to the first reference position during positioning movement of the drive member is spatially configured adjacent a first outer surface of the spring body. A distance between the first reference position and the second reference position is captured.

DESCRIPTION OF PREFERRED EMBODIMENT

Figure 1:
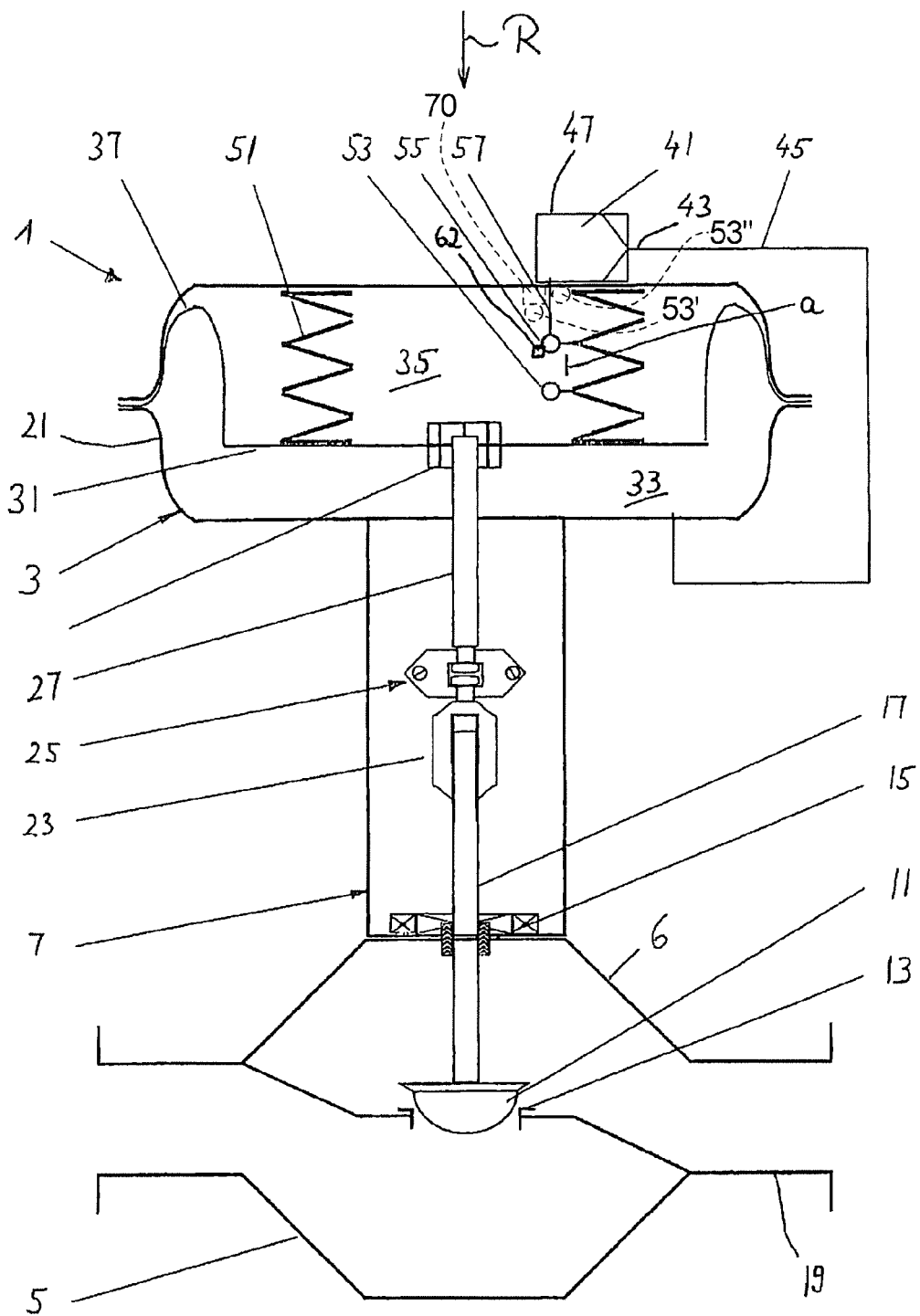
FIG. 1 is a schematic side view of a pneumatic field device according to the preferred embodiment and of an actuating drive for positioning a valve member.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated drive and method and such further applications of the principles of the invention as illustrated as would normally occur to one skilled in the art to which the invention relates are included.

An actuating drive is provided for positioning a final control element, in particular a valve member for a technical processing plant. The actuating drive comprises a drive member for actuating the final control element. For a translational actuating drive, commonly the driving member is a positioning rod extending outwardly from the inside of a housing of the actuating drive and detachably coupled to the final control element. In case of a pivoting drive the driving member can be a positioning shaft extending outwardly from the inside of the housing of the actuating drive and rotatably mounted at the housing wall. Furthermore, the actuating drive has a spring body with a predetermined modulus of elasticity. The spring body can be formed as a helical spring. The spring body has the characteristic that in the course of its dimension it essentially behaves homogeneously during elastic deformation.

The compressed spring body stores and releases elastic return forces to the final control element via the drive member from an arbitrary initial position in order to push the final control element to a predetermined target position, in particular a safety position. The initial position can be arbitrary and the result of a prior position control operation. The target position is previously defined, and is in particular a safety position in which the valve member for example closes on a valve seat.

Furthermore, the actuating drive has a device for capturing the position of the final control element, wherein the capturing device captures a distance between a spatially determined first reference position and a second reference position, spatially determined at an outer surface of the spring body, the outer surface moving relative to the first reference position during the positioning movement of the drive member.

The preferred embodiment utilizes the knowledge that the spring body, in particular a helical compression, spring behaves homogeneously elastically in the course of its longitudinal direction, that is in the acting direction of the return forces. If during the positioning movement, the movement of a second reference position at an outer surface of the spring body is captured with respect to a first reference position, stationary at the housing or also at the outer surface of the spring body, then, based on the predetermined transmission ratio between the determined change of distance and the total length change of the spring body, owing to its homogenous elastic property it can be unambiguously determined how the drive member and thus the final control element was moving under the effect of the positioning forces of the spring body. Thus, precise capturing of the actual position of the final control element is possible continuously during the positioning movement, and is in particular usable for a position control of a final control element.

The first and/or second reference position can be realized respectively by a geometric point or a surface range. In the preferred embodiment, the first reference position is defined by the mounting position of a simple position sensor that, for example, co-operates with a producer of a magnetic field at the second reference position in order to continuously capture the distance change between the reference positions during the positioning movement.

Preferably, the first and the second reference position are arranged with respect to each other in such a way that upon the deformation of the spring body and thus upon the displacement of the final control element they are on a linear displacement path extending essentially along the return direction of the spring body.

In the preferred embodiment, the first and the second reference position are disposed within a housing and thus free of external influences disturbing the position capturing measurement. The housing of the actuating drive can have a working chamber, in particular a pneumatic or hydraulic working chamber exposed to a working fluid, and a return chamber. In the return chamber, the spring body is preferably completely lodged. The first and the second reference position are disposed inside this return chamber. It shall be understood that the working chamber as well as the return chamber can be exposed to a working fluid.

In a further development of the preferred embodiment, the actuating drive has a housing, in particular fluid-tight, wherein in particular the working chamber is separated from the return chamber by a membrane-plate-arrangement, wherein the spring body rests on the plate at which the driving member is attached and at an inner surface of the housing.

The first reference position can preferably be defined spatially relative to the housing and can lie at the inside of the housing. Alternatively, the first reference position can be disposed in stationary fashion at an outside of a functional component mounted in stationary fashion inside the housing. The functional component can for example be a sealing element or the outer surface of an electronic component disposed within the housing. Alternatively, the first reference position can be disposed in stationary fashion at a location different with respect to the second reference position while also being located at the outer surface of the spring body. Therein, it is particularly preferred to position the first and the second reference positions as close as possible to each other. Owing to the compact arrangement, a direct inference of the actual displacement of the final control element can be achieved upon the determination of a very small distance change, owing to the homogenous elastic behavior of the spring body and the thereby predetermined transmission ratio between the distance change and the total length change.

In the preferred embodiment, the spring body is formed as a helical spring, in particular as a helical compression spring. Preferably, the second reference position is disposed at the outer surface of a winding of the helical spring. Also the first reference position can be disposed in stationary fashion at the outer surface of a winding of the helical spring that is in particular adjacent to the winding of the second reference surface, preferably in a direction of the return chamber, so that upon the deformation of the helical compression spring the first and the second reference position linearly move towards each other and away from each other in a longitudinal direction of the helical spring, in particular in its translational return direction.

In the preferred embodiment, the first and the second reference positions are disposed at windings of the helical spring directly adjacent, in particular in a return direction.

In the preferred embodiment, the position capturing device, in particular the sensor, is coupled in a signal-transmitting manner with a positioner, in particular via a signal line. The signal line can be physically designed as an electrically conducting wire. The positioner is preferably disposed inside the housing of the actuating drive, preferably in the return chamber, adjacent to a measurement circuitry of the position capturing device. Alternatively, the positioner can be disposed in a closed additional housing at the outside of the drive housing.

In the preferred embodiment, at the first or second reference position, a positioner is attached, in particular via a coupling arm, coupled to the first and the second reference position. The position sensor can capture in a sensing manner the position of the second or the first reference position relative to the first or the second reference position, respectively. The coupling arm can be injection molded, welded, or bolted to a winding of the helical compression spring, wherein further alternative fixing structures that do not influence the elastic behavior of the compression spring may be considered. In case that an effect on the elastic properties of the spring body is possible, the actuating drive is to be recalibrated with respect of the modified modulus of elasticity of the spring body.

In the preferred embodiment, the sensor is a HALL-sensor, an AMR-sensor or the like. The position sensor can feature an electronic component. At the second reference position a component for generating a magnetic field, in particular a permanent magnet, is mounted in stationary fashion, preferably via a supporting device, so that the respective sensor can detect and determine the relative displacement of the second reference position with respect to the first reference position at which preferably the sensor is positioned.

In a further development of the preferred embodiment, the modulus of elasticity of the spring body defines a range of proportionality within which the spring body is deformable for generating and releasing return forces. The range of proportionality of the modulus of elasticity is predetermined and in particular stored within a microelectronic circuitry of the position capturing device, and the range of proportionality is unchanging and in particular constant. In fact, the range of proportionality can change for different external conditions, such as different temperatures. However, the spring body is preferably to be chosen such that the range of proportionality essentially stays constant for the known operating conditions.

The preferred embodiment also relates to a field device with a control valve and the actuating drive positioning the control valve.

Furthermore, the preferred embodiment relates to a method for capturing the position of a final control element, in particular a valve member for a technical processing plant, to be positioned by means of an actuating drive. According to the method, the final control element is moved from the initial position to the target position, in particular the safety position, by means of a spring body. According to the preferred embodiment, a first reference position is spatially determined in the vicinity of the spring body or at the spring body, wherein a second reference position, moving relatively to the first reference position during the positioning movement, is spatially determined at an outside surface of the spring body, and a changing distance between the first reference position and the second reference position is captured in order to capture the actual displacement of the final control element via the distance change and a predetermined transmission ratio between the determined distance change and the total change in length of the spring body during the positioning movement of the drive member.

It shall be understood that the method according to the preferred embodiment can proceed according to the functionality of the above described actuating drive according to the preferred embodiment.

The preferred embodiment is based on the surprising insight that the transformation of a large distance to be measured, the total change in length of the spring body, into a small distance, and the change in distance of the reference positions, can be realized without a complicated lever or gear mechanism by using only a part of the movement of the return spring. The number of windings of the return spring defines clearly a gear mechanism with multiple transmission.

Further characteristics, advantages and features of the preferred embodiment will become apparent through the following description in conjunction with the accompanying drawings.

In FIG. 1 a pneumatically operated field device of a technical processing plant is given the reference numeral 1. The field device 1 comprises a pneumatic actuating drive 3, a control valve 5, and a mechanical coupling device 7 between the actuating drive 3 and the control valve 5.

The control valve 5 has a valve member 11 that can cooperate in an opening and closing manner with a valve seat 13 formed inside a process fluid duct 19 of the plant.

The control valve 5 has a valve housing 6 with a passage at which a valve package 15 ensures sealing. A positioning rod 17 at the side of the valve extends through the passage of the valve housing towards the pneumatic actuating drive 3.

Between the housing of the control valve 5 and the drive housing 21 of the actuating drive 3, a connecting yoke or a lantern 23 is disposed at which the actuating drive 3 is supported on the control valve 5.

Within the connecting yoke 23, which is preferably closed, the coupling device 7 is provided presenting a quick connector 25. At the side of the actuating drive a position rod 27 extends from the connector through a passage in the drive housing 21 and is fixed to a drive positioner 31. The actuating drive is divided into a working chamber 33 and a return chamber 35. The separation of the working chamber 33 and the return chamber 35 is realized by a membrane-plate arrangement, namely the drive positioner 31 and a membrane 37, wherein the membrane 37 is clamped in a fixed and fluid-tight manner at the outer side of the drive housing 21 between essentially equally shaped upper and lower lids of the drive housing 21.

At the outside of the actuating drive 3, in particular at the outside of the drive housing 21 facing away from the control valve 5, a positioner 41 is attached featuring a pneumatic signal output 43 at which the positioner 41 releases a pneumatic control signal via a pneumatic line 45 to the actuating drive 3, in particular to the working chamber 33. In order to determine the position of the valve member 11, the pneumatic actuating drive 3, in particular the positioner 41, has a position capturing device, the measurement processing circuitry of which is disposed inside the positioner housing 47. For capturing the position, the position capturing device utilizes the elastic deformation of a return spring, i.e. a helical compression spring 51, disposed inside the return chamber. For this purpose, a first reference position 53 and a second reference position 55 are defined in stationary fashion with respect to the outer surface of the helical compression spring 51. A position sensor 62 disposed for example at the second reference position 55 continuously captures the shortest distance a in the return direction R between the first and the second reference position 53, 55. The position sensor 62 at the second reference position 55 is connected to the positioner 41 in signal-transmitting manner via a signal line 57.

As shown in FIG. 1, the first reference position 53" shown in dashed lines can preferably be defined spatially in stationary fashion relative to the housing 21 and can lie at the inside of the housing 21. Alternatively, the first reference position as shown at 53' in dashed lines can be disposed in stationary fashion at an outside of a functional component 70 also shown in dashed lines and mounted in stationary fashion inside the housing. The functional component 70 can for example be a sealing element or the outer surface of an electronic component disposed within the housing. Alternatively, the first reference position 53 can be disposed in stationary fashion at a location different with respect to the second reference position while also being located at the outer surface of the spring body 51. Therein, it is particularly preferred to position the first and the second reference positions 53 and 55 as close as possible to each other.

Owing to the homogenous elastic deformation of the helical compression spring it is possible to define two adjacent measurement reference positions at a short distance without having to consider the full length of the helical compression spring 51. The small distance change between the reference position 53, 55 represents a direct transmission ratio because of the homogenous deformation of the helical compression spring 53 in order to determine the displacement distance of the valve member.

Surprisingly, this kind of position capturing through sensing of the reference position at the helical compression spring can be used to realize a complete control circuit for controlling the position of the valve member 11. It is surprising insofar as the helical compression spring serves the purpose of attaining the safety position and actually not of supporting the control process. In an emergency situation, that is upon venting of the working chamber 33, the valve member 11 is moved to the safety position in which valve member 11 rests on the valve seat 13 in a fluid-tight manner.

Figures 2A, 2B:
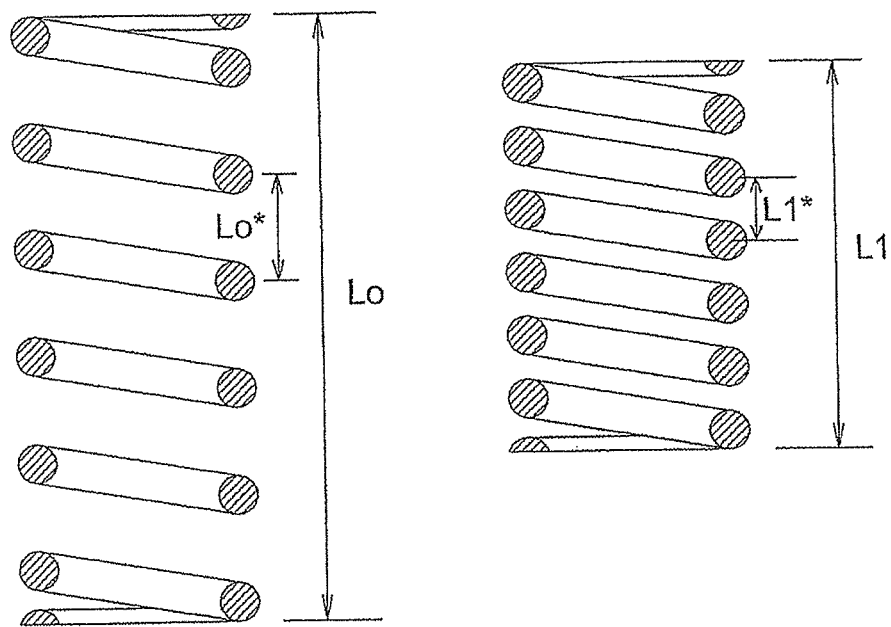
FIGS. 2a, b show respective cross sectional views of a helical compression spring in a compressed and a relaxed state, wherein the FIGS. 2a, 2b illustrate the principle of determining a position according to a predetermined transmission ratio.

In FIGS. 2a and 2b, the transmission ratio is visually illustrated, the transmission ratio according to the preferred embodiment being used to directly infer the total change of length ($L_0$-$L_1$) from only very small changes of distance ($L_0^*$-$L_1^*$).

Figure 3:
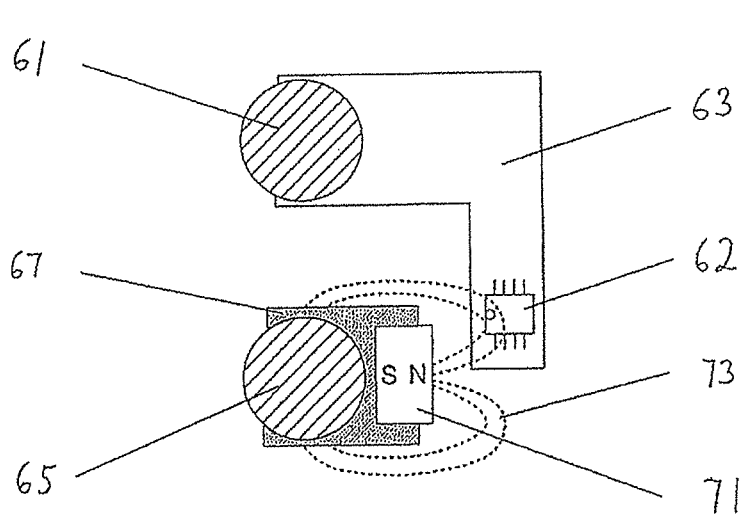
FIG. 3 illustrates a half cross-sectional view of a device for capturing the position of a final control element operated by an actuating drive of a field device of a technical processing plant according to the preferred embodiment.

FIG. 3 shows a preferred embodiment of the position capturing device. At a winding 61 of a helical compression spring 51 a coupling arm 63 is fixed, having an L-shape. At the free end of the coupling arm 63 an AMR-chip 62 is provided connected to the positioner 41 in a signal-transmitting manner.

At the lower winding 61 of the helical compression spring 51, adjacent in direction to the return force, where the second reference position is determined in stationary fashion, a support 67 is fixed at which a permanent magnet 71 is held, generating a magnetic field of which two magnetic field lines 73 are shown by example in FIG. 3.

Upon a movement of the winding 61 towards and away from the winding 65 the position of the AMR-chip 62 within the magnetic field changes, and this position change within the magnetic field of the permanent magnet 71 can be sensed by the AMR-chip. Owing to a homogenous elastic structure of the helical compression spring and the thereby defined transmission ratio, it is possible to determine a total change in length of the helical compression spring via the displacement of the windings 61, 65, through which a direct inference of the actual displacement of the valve member 11 is possible.

The features disclosed in the above description, the figures, and the claims can be relevant for the realization of the invention in various different embodiments individually as well as in any combination.

And although a preferred exemplary embodiment is shown and described in detail in the drawings and in the preceding specification, it should be viewed as purely exemplary and not as limiting the invention. It is noted that only a preferred exemplary embodiment is shown and described, and all variations and modifications that presently or in the future lie within the protective scope of the invention should be protected.

We claim as our invention:

1. An actuating drive for positioning a final control element, comprising:
   a drive member actuating the final control element;
   a spring body with a predetermined modulus of elasticity for pushing the drive member;
   the final control element being pushed via the drive member by elastic return forces of the spring body from an initial position to a target position;
   a capturing device for capturing a position of the final control element;
   the capturing device comprising a sensor for determining a distance between a first spatially determined reference position in a vicinity of or at the spring body and a second spatially determined reference position adjacent an outer surface of the spring body, the second reference position moving relative to the first reference position during a positioning movement of the drive member; and
   a fluid-tight housing containing said spring body and wherein the first reference position is at a position different from a location of the second reference position adjacent said outer surface of the spring body.

2. The actuating drive of claim 1 wherein the control element comprises a valve member for a technical processing plant.

3. The actuating drive of claim 1 wherein said target position comprises a safety position.

4. The actuating drive according to claim 1 wherein the first and the second reference positions are disposed within a housing of the actuating drive, the housing having a pneumatic or hydraulic working chamber and a return chamber in which the spring body is substantially entirely lodged, the first and the second reference positions being disposed within the return chamber, and the return chamber being exposed to a working fluid.

5. The actuating drive according to claim 1 wherein the first reference position is configured in stationary fashion relative to the fluid-tight housing at an inside of the fluid-tight housing.

6. The actuating drive according to claim 1 wherein the first reference position is configured in stationary fashion relative to the fluid-tight housing at an outside of a functional component fixed at an inside of the fluid-tight housing.

7. The actuating drive according to claim 1 wherein the spring body comprises a helical compression spring, the second reference position is disposed in stationary fashion relative to and adjacent said outer surface of the helical spring at a first winding, the first reference position being adjacent said outer surface of the same helical spring at a second winding adjacent to the first winding.

8. The actuating drive according to claim 1 wherein the position capturing device comprising said sensor is coupled to a positioner in a signal-transmitting manner via a signal line, the positioner being disposed inside said fluid-tight housing in a return chamber thereof, or at an outside of the fluid-tight housing.

9. The actuating drive according to claim 1 wherein the sensor is designed as a position sensor and is fixed to the first or the second reference position via a connecting arm coupled to the first or the second reference position, the position sensor capturing a position of the second or the first reference position, respectively.

10. The actuating drive according to claim 1 wherein the sensor of the position capturing device comprises a HALL-sensor or an AMR-sensor, and a component for generating a magnetic field comprising a permanent magnet is disposed in stationary fashion at and with respect to the second or the first reference position, respectively, via a separate holding device.

11. The actuating drive according to claim 1 wherein a modulus of elasticity of the spring body defines a predetermined, constant proportionality range within which the spring body is deformed for generating and releasing a return force.

12. A method for capturing a position of a final control element to be positioned by an actuating drive, a drive member of the actuating drive actuating the final control element, comprising the steps of:
   pushing by a spring body the final control element with the drive member from an initial position to a target position;
   spatially determining a first reference position in a vicinity of or at the spring body;
   spatially determining a second reference position adjacent an outer surface of the spring body moving relative to the first reference position during a positioning movement of the drive member, a fluid-tight housing containing said spring body and wherein the first reference position is at a position different from a location of the second reference position adjacent said outer surface of the spring body; and
   capturing a distance between the first reference position and the second reference position.

13. The method of claim 12 wherein the final control element comprises a valve member for a technical processing plant.

14. The method of claim 12 wherein said target position comprises a safety position.

15. The method of claim 12 wherein the first and the second reference positions are disposed within said fluid-tight housing, the fluid-tight housing having a pneumatic or hydraulic working chamber and a return chamber in which the spring body is substantially entirely lodged, the first and the second reference positions being disposed within the return chamber, and the return chamber being exposed to a working fluid.

16. The method of claim 12 wherein the first reference position is configured in stationary fashion relative to the fluid-tight housing at an inside of the fluid-tight housing.

17. The method of claim 12 wherein the first reference position is configured in stationary fashion relative to the fluid-tight housing at an outside of a functional component fixed at an inside of the fluid-tight housing.

18. The method of claim 12 wherein the spring body comprises a helical compression spring, the second reference position is disposed in stationary fashion relative to and adjacent said outer surface of the helical spring at a first winding, the first reference position being adjacent said outer surface of the same helical spring at a second winding adjacent to the first winding.

19. The method of claim 12 wherein the position capturing device comprises a sensor coupled to a positioner in signal-transmitting manner via a signal line, the positioner being disposed inside the fluid-tight housing in a return chamber thereof, or at an outside of the fluid-tight housing.

20. The method of claim 12 wherein the position capturing device comprises a sensor designed as a position sensor and fixed to the first or the second reference position via a connecting arm coupled to the first or the second reference position, the position sensor capturing a position of the second or the first reference position, respectively.

21. The method of claim 12 wherein the position capturing device comprises a sensor comprising a HALL-sensor or an AMR-sensor, and a component for generating a magnetic field comprising a permanent magnet is disposed in stationary fashion at and with respect to the second or the first reference position, respectively, via a separate holding device.

22. The method of claim 12 wherein a modulus of elasticity of the spring body defines a predetermined, constant proportionality range within which the spring body is deformed for generating and releasing a return force.

23. A valve assembly, comprising:
a valve for a technical processing plant comprising a processing fluid passage, a valve seat, and a valve member cooperating with the valve seat;
an actuating drive comprising a drive member for actuating the valve member, and a spring body for pushing the drive member, said spring body having an outer surface;
the valve member being pushed via the drive member by elastic return forces of the spring body from an initial position to a target position;
a capturing device for determining a position of the valve member;
the capturing device comprising a sensor for determining a distance between a first reference position associated with a first winding of the spring body and a second reference position associated with a second winding of the spring body, the first reference position moving relative to the second reference position during a positioning movement of the drive member; and
a fluid-tight housing containing said spring body and wherein the first reference position is at a position different from a location of the second reference position adjacent said outer surface of the spring body.

24. A method for capturing a position of a valve member of a valve for a technical processing plant, said valve having a processing fluid passage, a valve seat, and a valve member cooperating with the valve seat, wherein a drive member of an actuating drive actuates the valve member, and wherein a spring body pushes the drive member, said spring body having an outer surface, the valve member being pushed via the drive member by elastic return forces of the spring body from an initial position to a target position, comprising the steps of:
providing a capturing device for determining a position of the valve member, the capturing device comprising a sensor, a fluid-tight housing containing said spring body and wherein the first reference position is at a position different from a location of the second reference position adjacent said outer surface of the spring body; and
utilizing the sensor, determining a distance between a first reference position associated with a first winding of the spring body and a second reference position associated with a second winding of the spring body, the first reference position moving relative to the second reference position during a positioning movement of the drive member.

* * * * *